United States Patent [19]

Scharf et al.

[11] 4,066,494
[45] Jan. 3, 1978

[54] NITROGENOUS CONDENSATION PRODUCTS USED AS RETENTION AIDS IN PAPERMAKING

[75] Inventors: Emil Scharf; Rolf Fikentscher, both of Ludwigshafen; Werner Auhorn, Frankenthal; Werner Streit, Ludwigshafen, all of Germany

[73] Assignee: BASF Aktiengesellschaft, Rhineland-Pfalz, Germany

[21] Appl. No.: 594,648

[22] Filed: July 10, 1975

[51] Int. Cl.$^2$ ............................................. D21H 3/48
[52] U.S. Cl. ............................................. 162/164 EP
[58] Field of Search ............ 162/164 ER, 164 R, 190; 260/2 BP, 29.2 EP, 2 EN; 210/54 C

[56] References Cited

U.S. PATENT DOCUMENTS

| | | | |
|---|---|---|---|
| 2,913,356 | 11/1959 | Schroeder | 162/164 EP |
| 3,129,133 | 4/1964 | Doyle et al. | 162/164 EP |
| 3,635,842 | 1/1972 | Longoria et al. | 260/2 BP |
| 3,746,678 | 7/1973 | Dick et al. | 162/164 EP |

FOREIGN PATENT DOCUMENTS

| | | | |
|---|---|---|---|
| 686,202 | 5/1964 | Canada | 162/164 EP |
| 1,374,669 | 11/1963 | France | 260/2 EN |
| 1,179,493 | 1/1970 | United Kingdom | 162/190 |
| 1,156,516 | 6/1969 | United Kingdom | 162/164 EP |

*Primary Examiner*—S. Leon Bashore
*Assistant Examiner*—William F. Smith
*Attorney, Agent, or Firm*—Keil, Thompson & Shurtleff

[57] ABSTRACT

Production of water-soluble crosslinked auxiliaries for the papermaking industry by reacting a. one equivalent of NH groups of a polyalkylene polyamine having from 15 to 500 alkyleneimine units with
b. from 0.001 to 0.08 mole of a reaction product obtained from a polyalkylene oxide having from 8 to 100 alkylene oxide units with epichlorohydrin, in aqueous solution at a temperature of from 29° to 100° C. The viscosity of an aqueous solution containing 20% by weight of the crosslinked auxiliaries is from 300 to 1,500 centipoises (20° C).

3 Claims, No Drawings

NITROGENOUS CONDENSATION PRODUCTS USED AS RETENTION AIDS IN PAPERMAKING

This invention relates to novel reaction products of polyalkylene polyamines with relatively high molecular weight difunctional crosslinkers, which are of value for the papermaking industry. The invention also relates to the manufacture and use of such products as retention aids and flocculants in the papermaking industry.

It is well known that polyethyleneimine and, to a lesser extent, polypropyleneimine are useful in the papermaking industry as retention aids for fillers and fibers, as drainage aids during sheet formation and as flocculants in pulp recovery. Such products have been known for more than 30 years. New progress was achieved by the use of epichlorohydrin as crosslinker giving crosslinked polyethyleneimines such as are described, for example, in German Pat. No. 1,670,296.

Finally, it is also known that crosslinking, for example with epichlorohydrin, of polyamidoamines, i.e. reaction products of such polyamines with dicarboxylic acids, gives paper auxiliaries which also constitute good retention aids. However, in use, these groups of products suffer from the drawback that each shows its optimum effect only within a limited pH range. For example, crosslinked polyamines obtained according to German pat. No. 1,670,296 show best results only at neutral pH, whilst crosslinked polyamidoamines such as are disclosed in U.S. Pat. No. 3,250,664 exhibit optimum properties only at acid pH.

In papermaking, more or less rapid changes in manufacturing conditions from acid to neutral and vice versa are usually necessary when different types of paper are made, and this gave rise, at an early stage, to the desire to develop an auxiliary which is capable of producing optimum results both at neutral and at acid pH.

The last improvement which took place in this field and which has long given satisfactory results is the teaching of German Published Application 1,802,435, according to which the problem is solved by first grafting ethyleneimine onto a polyamidoamine and then crosslinking with epichlorohydrin.

The increasing demands of paper manufacturers for rationalization in the process, i.e. for maximum retention of fiber and filler, for good clarification of waste water, for acceleration of the process and maximum paper whiteness, have led to the problem on which the present invention is based, i.e. the problem of providing novel auxiliaries by means of which the drainage rate is higher than that achieved with the auxiliaries of the last-mentioned reference, the retention of fiber and filler on the wire screen is increased and also the flocculating action obtained in the recovery of pulp is improved whilst maintaining the good paper whiteness as far as possible and effecting minimum impairment of the effect of optical brighteners without recurrence of the already solved problem of use at both acid and neutral pH.

Thus the present invention aims at improvements leading to more economical operation of the various processes for the manufacture of paper.

The subject matter of German Published Application 1,546,290 is the exclusive use of water-soluble products containing amino groups and ether groups and having a molecular weight of at least 2,000 and which have been obtained by reacting polyfunctional derivatives of polyols with amines which are at least difunctional with reference to the polyfunctional derivatives of the polyols, of which components at least one contains one or more ether groups, or quaternization products thereof as floatation agents for the recovery of fibers and fillers from waste waters coming from papermaking machines.

Such agents are preferably those derived from polyalkylene polyamines having from 2 to 6 alkyleneimine units, for example pentaethylene hexamine, diethylene triamine or propylene diamine.

These agents are particularly suitable for improving floatation in pulp recovery and ensure a success of the process equal to that obtained in German Published Application 1,802,435. However, these agents are not equal to those mentioned in the above reference as regards their properties as retention and drainage aids in paper manufacture.

The invention relates to a process for the manufacture of nitrogenous condensation products by reacting polyalkylene polyamines having at least two alkyleneimine groups with polyalkylene oxide derivatives containing chlorohydrin groups at the ends of the molecule, which process is characterized in that a. one nitrogen equivalent of a polyalkylene polyamine containing from 15 to 500 alkyleneimine units is reacted with b. from 0.08 to 0.001 and preferably from 0.06 to 0.002 molar portions of a polyalkylene oxide derivative which contains at least 8 alkylene oxide units and which has been reacted, at the terminal OH grups, with at least the equivalent amount of epichlorohydrin, at a temperature of from 20° to 100° C and preferably from 40° to 80° C, the reaction being carried to a point at which high molecular weight resins which are still water-soluble are formed, the viscosity thereof being greater than 300 mPa.sec at 25° C, measured on a 20–25% aqueous solution.

The principle of the reaction is known, as mentioned bove, from German Published Application 1,546,290. However, said publication does not disclose that this reaction may be preferably carried out with higher polyalkylene polyamines containing at least 15 alkyleneimine units in the molecule and that products are thereby obtained which show maximum action as retention and drainage aids in addition to their action as floatation auxiliaries.

German Published Application 2,162,567 discloses a sequence of reactions in which, however, a small amount of filamentous polyethers having terminal tertiary amino groups, for example ethers obtained from glycol and epichorohydrin and dimethylamine as crosslinker, is reacted with a (polyamide)-polyalkylenepolyamine and then with from 0.2 to 2 moles of epichlorohydrin per equivalent of secondary amino group.

Thus, the process of the invention, which basically relates to the use of a specific number of alkyleneimine units in the starting product and to specific molar ratios and, above all, to the achievement of specific final viscosities and which therefore produces novel products of optimum efficiency, constitutes an unexpected technical advance in the art.

As mentioned above, the polyalkylene polyamides to be used as starting products in the manufacture of the products of the invention are those having from 15 to 500 alkyleneimine units, preferably ethyleneimine units. They are obtained by conventional polymerization of, say, ethyleneimine in an acid medium. We prefer to use compounds having from 15 to 500 ethyleneimine units.

The other reactant is the polyalkylene oxide derivative which has been reacted with epichlorohydrin at the terminal OH groups. Suitable compounds of this kind are generally those containing, in the unreacted polyalkylene oxide, from 8 to 100 alkylene oxide units per polyalkylene oxide group. This means that when polyfunctional compounds are reacted in alkylene oxide the amount of alkylene oxide units contained per polyalkylene oxide chain must be such that the number 100 is not exceeded in each chain. Preferably however, we use block copolymers of the formula $$A[(OR^1)_m(OR^2)_n(OR^1)_pOH]_x$$

in which $R^1$ is an ethylene radical, $R^2$ is a 1,2-propylene radical, $m$ and $p$ denote values of from 4 to 50, $n$ is a value of from 0 to 50, $x$ is a value from 2 to 6 and A is the radical of a polyhydric alcohol having from 2 to 6 carbon atoms or a polypropylene oxide radical having from 1 to 50 propylene oxide units, in which case $n$ is equal to 0. Examples of individual representatives are ethoxylated or ethoxylated-oxypropylated polyhydric alcohols such as glycol, propylene glycol, glycerol, trimethylolpropane and pentaerythritol and simple polypropylene glycol which may contain up to 50 propylene oxide units in the molecule. The latter substance produces, on ethoxylation on both sides, mixed block-copolymers of ethylene oxide and propylene oxide. Basically however, mixed polymerized ethylene oxide and propylene oxide chains may be reacted with the groups of the polyfunctional compounds bearing active hydrogen atoms, but this generally has no added advantage.

The polyethoxylated or polyethoxylated/polyoxypropylated compounds are thus those bearing at least two terminal free hydroxyl groups. The terminal hydroxyl grups are the reactive sites for subsequent reaction with epichlorohydrin. In this reaction at least equivalent amounts of epichlorohydrin are used with reference to the number of OH groups present and it is preferred to use from 1.0 to 1.5 moles of epichlorohydrin per equivalent of OH groups. This finally results in compounds which are converted by elimination of HCl to polyglycidyl ethers, compounds which effect the actual crosslinking action on the beforementioned polyalkylene polyamines and which are hereinafter referred to as crosslinkers. The reaction of the epichlorohydrin with the polyalkylene oxide derivatives takes place according to well-known reaction mechanisms and is initiated by Lewis acids. Examples of suitable Lewis acids are borofluoride etherate, phosphoric acid, sulfuric acid, perchloric acid, chloroacetic acid, aromatic sulfonic acids, zinc chloride and aluminum chloride. It is generally convenient, however, to use borofluoride etherate as Lewis acid for this reaction.

The high molecular weight polyfunctional crosslinking compounds are then reacted with the polyalkylene polyamines, from 0.08 to 0.001 mole of crosslinker being used per equivalent of nitrogen in the polyalkylene polyamine. Although the amount of said polyfunctional compound required for crosslinking depends, of course, on the constitution of the polyalkylene polyamine used, hydrolysis of this high molcular weight crosslinkers is always possible and it is therefore necessary, for a given starting polyalkylene polyamine, to use more crosslinker the higher the reaction temperature and the higher the water content of the resin solution if a solution of a specific viscosity is to be obtained. Use is made of the aforementioned amounts of crosslinker, preferably from 0.06 to 0.002 molar portions per equivalent of nitrogen in the polyalkylene polyamine. The crosslinking reaction is conveniently carried out in 5 to 50% and preferably in 10 to 30% aqueous solution, based on the total weight of the reactants. The amount of crosslinker necessary to achieve the desired degree of crosslinking may be added to the reaction solution either all at once or in portions. The course of the reaction is followed by observing the increase in viscosity of the aqueous solution. The portion-wise procedure is always preferable, since the reaction can be better controlled in this manner and the risk of the reaction mixture gelling is much less. Furthermore, the portion-wise addition of the higher molecular weight crosslinker obviates the addition of an excessive quantity and makes it easy to obtain a specific viscosity. The reaction is carried to the point where the high-molecular weight resins formed are still just water-soluble and have a viscosity of more than or equal to 300 mPa.sec when measured at 20° C on a 20–25% aqueous solution. It is preferred to aim at resins having viscosities of from 400 to 1500 mPa.sec. The reaction is generally carried out at temperatures of from 20° to 100° C and preferably from 40° to 80° C over from 1 to 10 hours.

On account of the amino groups contained therein, the condensation products of the invention are alkaline. However, the action of the products (resins) of the invention, particularly their action as drainage and retention aids, is not affected by neutralization of the resin solutions with acids. In the majority of cases, they have the same advantages as the products of German Publication Application 1,802,435, i.e. they can be used under both acid and alkaline conditions. Compared with products obtained from basically crosslinked polyamido amines or 1,2-polyalkylene polyamines crosslinked with epichlorohydrin alone, they again shown an improved action as regards the retention of fillers and the drainage rate. Compared with the products of German Published Application 1,802,435 there is generally also an unexpected increase in the effects achieved, particular mention being made of the greatly improved whiteness of the papers, which show much less tendency to yellow even when stored for relatively long periods. These products make it possible to operate in all pH ranges occurring in papermaking. As compared with the products of German Published Application 1,546,290, in which low molecular weight polyalkylene polyamines are used, the products of the invention show improved action as retention aids for fillers and fibers.

The products of the invention may be successfully used in the manufacture of papers of all kinds, of sized and unsized cardboard, in the presence or absence of aluminum sulfate. The amount of agent used is from 0.01 to 0.3% by weight, based on the dry weight of the cellulose fibers in the pulp.

In the following Examples the parts and percentages are by weight.

EXAMPLES

A. Manufacture of polyethyleneimine (PEI)

A solution of E g of ethyleneimine in F g of water is added dropwise to a solution of A g of ethylene diamine monosulfate in B g of water at C° C over D hours. The mixture is then maintained at H° C for G hours until no ethyleneimine ring can be detected with p-nitrobenzyl pyridine. The resulting polyethylene polyamine solutions show the following properties:

I: molecular weight: Ultra centrifuge (via the sedimentation equilibrium)[+1] measured by vapor pressure osmometry [+2]

K: viscosity (45% solution, 20° C, falling ball method by Hoeppler): centipoise

L: density (45% solution, 20° C) g/ml

M: refractory index (45% solution, 20° C)

TABLE

| Designation | V1 | V2 | V3 | V4 | V5 | V6 |
|---|---|---|---|---|---|---|
| molar ratio of ethylene diamine : EI =1 : | 20 | 35 | 50 | 75 | 100 | 500 |
| A | 272 | 156 | 109 | 73 | 55 | 10.9 |
| B | 987 | 871 | 259 | 790 | 359 | 361 |
| C | 85–90 | ca. 90 | 90–95 | 86–92 | 84–94 | 88–96 |
| D | 8 | 8 | 7.2 | 7.5 | 8 | 8.5 |
| E | 2150 | 2150 | 2150 | 2150 | 2150 | 2150 |
| F | 1435 | 1435 | 2000 | 1433 | 1900 | 1800 |
| G | 2.5 | 2.5 | 3 | 4 | 4 | 6 |
| H | 90 | 95 | 95 | 90 | 90 | 90 |
| I | — | 1450[+2] | 2680[+1] | — | 4900[+1] | 18200[+1] |
| K | 122 | 135 | 253 | 334 | 378 | 950 |
| L | 1.079 | 1.076 | 1.071 | 1.071 | 1.071 | 1.068 |
| M | 1.4358 | 1.4360 | 1.4360 | 1.4360 | 1.4351 | 1.4341 |

B. Manufacture of polyethylene glycol ether-bis-β-hydroxy-γ-chloropropyl ether (PDCH)

To I g of a polyethylene glycol ether having an average molecular weight of II EO units (hydroxyl number III, water content according to K. Fischer IV), there are added V g of epichlorohydrin, VI g of borofluoride etherate are added and the mixture is held at from 60° to 75° C whilst a further VII g of epichlorohydrin are added over from about 0.5 to 1.5 hours. Condensation is continued at from 60° to 70° C until the epoxide titer of the solution has fallen to 0 (VIII hours). The resulting product has a chlorohydrin content of IX milliequivalents/g (determined by boiling for 30 minutes with 0.1N NaOH followed by back-titration) and an acid content of X milliequivalents/g.

TABLE

| Designation | V7 | V8 | V9 | V10 | V11 | V12 | V13 | V14 | V15 |
|---|---|---|---|---|---|---|---|---|---|
| molar ratio of polyethylene glycol ether : epichlorohydrine = 1: | 3.0 | 2.2 | 3.0 | 2.2 | 2.2 | 2.6 | 3.0 | 2.2 | 3.0 |
| I | 2328 | 2716 | 3312 | 4050 | 4542 | 4542 | 4542 | 4774 | 4774 |
| II | 4 | 4 | 9 | 18 | 34 | 34 | 34 | 90 | 90 |
| III | 579.5 | 572.5 | 266 | 136 | 79 | 83.5 | 81.0 | 29 | 29 |
| IV | 0.066 | 0.04 | 0.10 | 0.22 | 0.035 | 0.03 | 0.025 | 0.02 | 0.04 |
| V | 333 | 285 | 222 | 102 | 61 | 72 | 83 | 24 | 33 |
| VI | 3.5 | 5.0 | 6.6 | 8.1 | 9.1 | 9.1 | 9.1 | 12.0 | 12.0 |
| VII | 2997 | 2565 | 1998 | 916 | 549 | 650 | 750 | 220 | 300 |
| VIII | 4 | 7.2 | 3.2 | 4.0 | 5 | 5 | 5.4 | 5.5 | 4 |
| IX | 5,36 | — | 3.52 | 2.00 | 1.24 | 1.33 | 1.34 | 0.49 | 0.54 |
| X | 0.004 | 0.011 | 0.0097 | 0.0085 | 0.014 | 0.0084 | 0.006 | 0.014 | 0.013 |

C. Crosslinking $a$ g of a $b$% solution of the polyethylene imine $c$ (ditri denotes diethylene triamine, tritetra denotes triethylene tetramine) are heated to $d$ ° C and are crosslinked over $e$ hours by the addition of $f$ g of a $g$% solution of crosslinker $h$ (epi denotes epichlorohydrin). During crosslinking, the pH of the solution is maintained at 9.5 by the addition of caustic soda (50% solution) added is $i$ g. The final viscosity of the approximately $k$% resin is $l$ centipoise (measured at 20° C) and its pH is $m$. It is neutralized with $n$ g of formic acid (75% solution) to a pH of $o$ and diluted with $p$ g of water to give an active content (WS) (caustic soda and formic acid not being regarded as WS) of $q$ %. The final viscosity is $r$ centipoise, measured at 20° C by the falling ball method.

| Designation | Comparative Examples (action inferior) | | | | | | | | | Examples (action good) | | | | | | | |
|---|---|---|---|---|---|---|---|---|---|---|---|---|---|---|---|---|---|
| | V16 | V17 | V18 | V19 | V20 | V21 | V22 | V23 | V24 | V25 | V26 | V27 | V28 | V29 | V30 | V31 | V32 |
| PEI | 50 | ditri | tritetra | 20 | 20 | 100 | tritetra | 35 | tritetra | 20 | 35 | 50 | 75 | 50 | 50 | 100 | 100 |
| PDCH | epi | 4 | 4 | 4 | 4 | 4 | 9 | 9 | 18 | 34 | 90 | 18 | 18 | 90 | 34 | 34 | 90 |
| molar ratio of PDCH:epi = 1: | | | | | | | | | | | | | | | | | |
| a | 1600 | 3.0 | 2.2 | 2.2 | 2.2 | 2.2 | 3.0 | 3.0 | 2.2 | 2.2 | 3.0 | 2.2 | 2.2 | 3.0 | 2.6 | 3.0 | 2.2 |
| b | 22 | 250 | 400 | 500 | 1200 | 1400 | 300 | 800 | 250 | 2000 | 500 | 3400 | 1000 | 400 | 800 | 1000 | 800 |
| c | V 3 | 20 | 20 | 25 | 20 | 20 | 20 | 20 | 20 | 20 | 25 | 20 | 20 | 25 | 20 | 20 | 20 |
| d | 70–76 | ditri | tritetra | V 1 | V 1 | V 5 | tritetra | V 2 | tritetra | V 1 | V 2 | V 3 | V 4 | V 3 | V 3 | V 5 | V 5 |
| e | 5.3 | 68–71 | 66–70 | 68–75 | 70 | 69–71 | 68–71 | 69–71 | 68–70 | 68–73 | 77–80 | 65–70 | 69–71 | 75–80 | 69–70 | 68–70 | 68–72 |
| f | 57.8[1] | 5.0 | 6.2 | 5.3 | 6.5 | 5.5 | 3.5 | 5.5 | 9.5 | 5.7 | 10 | 7.5 | 6.0 | 6.3 | 5.2 | 5.5 | 14 |
| g | 100[1] | 1350 | 1068 | 250 | 582 | 319 | 1505 | 413.5 | 1754 | 3038 | 1015 | 1971 | 40.4 | 610 | 653 | 479 | 1218 |
| h | epi | 20[2] | 20[2] | 25[2] | 20[2] | 20[2] | 20 | 20[3] | 20 | 20 | 25 | 20 | 20 | 25 | 20 | 20 | 20 |
| i | — | V 7 | V 8 | V 8 | V 8 | V 8 | V 9 | V 9 | V 10 | V 11 | V 15 | V 10 | V 10 | V 15 | V 12 | V 13 | V 14 |
| k | 22 | 90.0 | 80.5 | 24 | 61.5 | 30 | 72 | 19 | 43.5 | 34 | 18 | 47 | 11 | 10 | 8 | 7 | 19 |
| l | 20 | 20 | 20 | 15[4] | 20 | 20 | 20 | 20 | 20 | 20 | 25 | 20 | 20 | 25 | 20 | 20 | 20 |
| m | 844 | 1100 | 926 | 1560 | 1940 | 2300 | 809 | 1360 | 2360 | 1560 | 2490 | 836 | 1460 | 4945 | 1340 | 659 | 1650 |
| n | 10.3 | 10.3 | 10.1 | 9.5 | 10.5 | 10.4 | 10.4 | 9.8 | 10.3 | 9.9 | 10.1 | 10.3 | 10.0 | 10 | 10.4 | 10.6 | 10.5 |
| o | 105 | 30 | 33 | not neutralized | 126 | 123 | 31 | 60 | 20 | 170.5 | — | 292 | 78.5 | not neutralized | 74.5 | 92.5 | 70.5 |
| p | 8.5 | 8.0 | 8.0 | | 8.0 | 8.0 | 8.0 | 75 | 8.0 | 8.0 | 10.1 | 8.0 | 8.0 | | 8.0 | 8.0 | 8.0 |
| q | 81 | 57 | 57 | | 10 | 67 | 95 | 18 | 121 | 367 | 362 | 250 | 69 | | 78 | 64 | 134 |
| r | 20 | 18 | 18 | | 18 | 18 | 18 | 18 | 18 | 18 | 20 | 18 | 18 | | 18 | 18 | 18 |
| | 720 | 920 | 740 | | 760 | 1535 | 514 | 857 | 1080 | 980 | 614 | 470 | 869 | | 968 | 492 | 572 |

[1]a further 250 g of water are added (22% crosslinker)
[2]in a 1:2 w/w mixture of alcohol and water
[3]in a 1:3 w/w mixture of alcohol and water
[4]diluted to 15% WS during resin formation The following Tables present a comparison of the papermaking properties of our products compared with those of a modified polyethylene (PEI) prepared according to Examples of German Published Application 1,802,435.

Measuring methods

Acceleration of drainage

This is characterized by the reduction in the degree of freeness in °SR. The degree of freeness in °SR is determined according to Leaflet 107 of the Verein der Zellstoff- und Papierchemiker und Ingenieure.

Filler retention

This is characterized by the ash content of sheets of paper produced on a Koethen apparatus according to Leaflet 108 of the Verein der Zellstoff- und Papierchemiker und Ingenieure.

Composition of pulp for paper to be tested:

80% of bleached sulfite cellulose 35° SR
2% of China clay

Pulp density: 0.24 g/l.

Influence on paper whiteness and effect on optical brighteners

This is characterized by the whiteness of ash-free sheets of paper:
composition of pulp:
  100% of bleached sulfite cellulose (35° SR)
  0.15% of optical brightener
  0.5% of alum
  0.06% of resin additive
Measurement:
  percentage reflectance measured in known manner with a Zeiβ-Elrepho instrument, filter R46T with and without UV excitation.

TABLE 1a (Example 16)
Drainage acceleration (measured as reduction in the degree of freeness in ° SR)
Material: Newspapers (beaten in Ultraturrax unit to a smooth composition)

|  | pH 7.3 | pH 5 | 1.5% of alum |
|---|---|---|---|
| Additive (100% resin, based on absolutely dry cellulose) | 0.05  0.1% | 0.05  0.1% | |
| Control value (no resin added) (° SR) | 62 | 56 | |
| Modified PEI (according to Ex. 6 of German Published Application 1,802,435) | 45  32 | 39  37 | |
| Resin of Example 16 | 49  33 | 43  40 | |

TABLE 1b

Filler retention: ash content of paper in %; addition of resin (100%): 0.015% and 0.03%, based on cellulose and filler

| pH of fiber suspension | 6 | 4.8 | |
|---|---|---|---|
| Alum added, based on cellulose and filler: | 0.5% | 1.5% | |
| Control value: | 6.2 | 6.3 | % of ash |
| Modified PEI (of Ex. 6 of German Published Application 1,802,435): | | | in paper |
| 0.015% addition | 8.6 | 9.9 | |
| 0.04 addition | 11.2 | 11.5 | |
| Resin of Example 16: | | | |
| 0.015% addition | 7.3 | 8.9 | |
| 0.03% addition | 9.4 | 9.7 | |

TABLE 1c

Influence on paper whiteness and effect on optical brighteners

|  | Control value | Resin of Ex. 6 of German Published Application 1,802,435 | Resin of Example 16 |
|---|---|---|---|
| with UV | 94.3 | 80.8 | 78.9 |
| without UV | 87.2 | 78.9 | 76.4 |

TABLE 2a (Example 17)
Drainage acceleration (measured as reduction in freeness in ° SR)
Material: Newspapers (beaten in Ultraturrax unit to a smooth composition)

|  | pH 7.3 | pH 5 | 1.5% of alum |
|---|---|---|---|
| Additive (100% resin, based on absolutely dry cellulose) | 0.05  0.1% | 0.05 | 0.1% |
| Control value (no resin added) (° SR) | 70 | 58 | |
| Modified PEI (according to Ex. 6 of German Published Application 1,802,435) | 55  45 | 46 | 44 |
| Resin of Example 17 | 63  55 | 48 | 47 |

TABLE 2b

Filler retention: ash content of paper in %; addition of resin (100%): 0.015% and 0.03%, based on cellulose and filler

| pH of fiber suspension | 6 | 4.8 | |
|---|---|---|---|
| Alum added, based on cellulose and filler: | 0.5 | 1.5% | |
| Control value: | 3.1 | 3.9 | % of ash |
| Modified PEI (of Ex. 6 of German Published Application 1,802,435): | | | in paper |
| 0.015% addition | 5.6 | 7.3 | |
| 0.03% addition | 7.8 | 7.9 | |
| Resin of Example 17: | | | |
| 0.015% addition | 5.4 | 4.4 | |
| 0.03% addition | 7.0 | 5.8 | |

TABLE 2c

Influence on paper whiteness and effect on optical brighteners

|  | Control value | Resin of Ex. 6 of German Published Application 1,802,435 | Resin of Example 17 |
|---|---|---|---|
| with UV | 92.7 | 80.5 | 84.2 |
| without UV | 86.8 | 78.1 | 81.7 |

TABLE 3a (Example 18)
Drainage acceleration (measured as reduction in freeness in ° SR)
Material: Newspapers (beaten in Ultraturrax unit to a smooth composition)

|  | pH 7.3 | pH 5 | 1.5% of alum |
|---|---|---|---|
| Additive (100% resin, based on absolutely dry cellulose | 0.05%  0.1% | 0.05 | 0.1% |
| Control value (no resin added) (° SR) | 47 | 50 | |
| Modified PEI (according to Ex. 6 of German Published Application 1,802,435) | 34  27 | 38 | 36 |
| Resin of Example 18 | 39  30 | 40 | 38 |

TABLE 3b

Filler retention: ash content of paper in %; addition of resin (100%): 0.015% and 0.03%, based on cellulose and filler

| pH of fiber suspension | 6 | 4.8 | |
|---|---|---|---|
| Alum added, based on cellulose and filler: | 0.5% | 1.5% | |
| Control value: | 3.6 | 3.8 | % of ash |
| Modified PEI (of Ex. 6 of German Published Application 1,802,435): | | | in paper |
| 0.015% addition | 6.6 | 7.3 | |
| 0.03% addition | 8.8 | 9.0 | |
| Resin of Example 18: | | | |
| 0.015% addition | 6.5 | 6.8 | |

TABLE 3b-continued

| | | |
|---|---|---|
| 0.03% addition | 8.8 | 8.3 |

TABLE 3c

Influence on paper whiteness and effect on optical brighteners

| | Control value | Resin of Ex. 6 of German Published Application 1,802,435 | Resin of Example 18 |
|---|---|---|---|
| with UV | 93.3 | 80.7 | 82.0 |
| without UV | 87.1 | 78.6 | 80.5 |

TABLE 4a (Example 19)
Drainage acceleration (measured as reduction in freeness in ° SR)
Material: Newspapers (beaten in Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 44 | | 57 | |
| Modified PEI (according to Ex. 6 of German Published Application 1,802,435) | 33 | 28 | 44 | 43 |
| Resin of Example 19 | 35 | 29 | 49 | 47 |

TABLE 4b

Filler retention: ash content of paper in %; addition of resin (100%): 0.015% and 0.03%, based on cellulose and filler

| pH of fiber suspension | 6 | 4.8 | |
|---|---|---|---|
| Alum added, based on cellulose and filler: | 0.5% | 1.5% | |
| Control value: | 3.6 | 3.9 | % of ash in paper |
| Modified PEI (of Ex. 6 of German Published Application 1,802,435): | | | |
| 0.015% addition | 6.6 | 8.2 | |
| 0.03% addition | 9.1 | 10.3 | |
| Resin of Example 19: | | | |
| 0.015% addition | 5.4 | 5.9 | |
| 0.03% addition | 7.2 | 7.9 | |

TABLE 4c

Influence on paper whiteness and effect on optical brighteners

| | Control value | Resin of Ex. 6 of German Published Application 1,802,435 | Resin of Ex. 19 |
|---|---|---|---|
| with UV | 93.1 | 80.7 | 80.6 |
| without UV | 87.2 | 78.4 | 78.8 |

TABLE 5a (Example 20)
Drainage acceleration (measured as reduction in freeness in ° SR)
Material: Newspapers (beaten in Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 68 | | 62 | |
| Modified PEI (according to Ex. 6 of German Published Application 1,802,435) | 53 | 40 | 40 | 36 |
| Resin of Example 20 | 57 | 40 | 42 | 39 |

TABLE 5b

Filler retention: ash content of paper in %; addition of resin (100%): 0.015% and 0.03%, based on cellulose and filler

| pH of fiber suspension | 6 | 4.8 | |
|---|---|---|---|
| Alum added, based on cellulose and filler: | 0.5% | 1.5% | |
| Control value: | 4.1 | 5.0 | % of ash in paper |
| Modified PEI (of Ex. 6 of German Published Application 1,802,435): | | | |
| 0.015% addition | 7.5 | 8.3 | |
| 0.03% addition | 10.5 | 9.5 | |
| Resin of Example 20: | | | |
| 0.015% addition | 7.8 | 6.4 | |
| 0.03% addition | 9.0 | 7.3 | |

TABLE 5c

Influence on paper whiteness and effect on optical brighteners

| | Control value | Resin of Ex. 6 of German Published Application 1,802,435 | Resin of Example 20 |
|---|---|---|---|
| with UV | 95.8 | 79.3 | 79.5 |
| without UV | 88.8 | 77.4 | 77.6 |

TABLE 6a (Example 21)
Drainage acceleration (measured as reduction in freeness in ° SR)
Material: Newspapers (beaten in Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 73 | | 65 | |
| Modified PEI (according to Ex. 1 of German Published Application 1,802,435) | 54 | 38 | 48 | 46 |
| Resin of Example 21 | 54 | 40 | 50 | 47 |

TABLE 6b

Filler retention: ash content of paper in %; addition of resin (100%): 0.015% and 0.03%, based on cellulose and filler

| pH of fiber suspension | 6 | 4.8 | |
|---|---|---|---|
| Alum added, based on cellulose and filler: | 0.5% | 1.5% | |
| Control value: | 2.5 | 3.3 | % of ash in paper |
| Modified PEI (of Ex. 1 of German Published Application 1,802,435): | | | |
| 0.015% addition | 5.1 | 5.2 | |
| 0.03% addition | 6.8 | 8.2 | |
| Resin of Example 21: | | | |
| 0.015% addition | 4.3 | 5.1 | |
| 0.03% addition | 7.2 | 6.9 | |

TABLE 6c

Influence on paper whiteness and effect on optical brighteners

| | Control value | Resin of Ex. 1 of German Published Application 1,802,435 | Resin of Example 21 |
|---|---|---|---|
| with UV | 95.3 | 82.6 | 83.8 |
| without UV | 88.2 | 78.5 | 79.3 |

TABLE 7a (Example 22)
Drainage acceleration (measured as reduction in freeness in ° SR)
Material: Newspapers (beaten in Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 70 | | 58 | |
| Modified PEI (according to Ex. 3B of German Published Application 1,802,435) | 55 | 45 | 46 | 44 |
| Resin of Example 22 | 62 | 53 | 46 | 44 |

TABLE 7b

Filler retention: ash content of paper in %; addition of resin (100%): 0.015% and 0.03%, based on cellulose and filler

| pH of fiber suspension | 6 | 4.8 |
|---|---|---|

TABLE 7b-continued

| | | | |
|---|---|---|---|
| Alum added, based on cellulose and filler: | 0.5% | 1.5% | |
| Control value: | 3.1 | 3.9 | % of ash in paper |
| Modified PEI (of Ex. 3B of German Published Application 1,802,435): | | | |
| 0.015% addition | 5.6 | 7.3 | |
| 0.03% addition | 7.8 | 8.9 | |
| Resin of Example 22: | | | |
| 0.015% addition | 5.5 | 6.6 | |
| 0.03% addition | 7.1 | 7.7 | |

TABLE 7c

Influence on paper whiteness and effect on optical brighteners

| | Control value | Resin of Ex. 3B of German Published Application 1,802,435 | Resin of Example 22 |
|---|---|---|---|
| with UV | 88.7 | 78.8 | 81.5 |
| without UV | 84.2 | 76.7 | 79.1 |

TABLE 8a (Example 23)
Drainage acceleration (measured as reduction in freeness in ° SR)
Material: Newspapers (beaten in Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 73 | | 65 | |
| Modified PEI (according to Ex. 1 of German Published Application 1,802,435) | 54 | 39 | 48 | 46 |
| Resin of Example 23 | 57 | 42 | 50 | 48 |

TABLE 8b

Filler retention: ash content of paper in %; addition of resin (100%): 0.015% and 0.03%, based on cellulose and filler

| | | | |
|---|---|---|---|
| pH of fiber suspension | 6 | 4.8 | |
| Alum added, based on cellulose and filler: | 0.5% | 1.5% | |
| Control value: | 2.9 | 2.2 | % of ash in paper |
| Modified PEI (of Ex. 1 of German Published Application 1,802,435): | | | |
| 0.015% addition | 6.7 | 7.4 | |
| 0.03% addition | 9.5 | 9.7 | |
| Resin of Example 23: | | | |
| 0.015% addition | 5.5 | 7.9 | |
| 0.03% addition | 8.0 | 9.4 | |

TABLE 8c

Influence on paper whiteness and effect on optical brighteners

| | Control value | Resin of Ex. 1 of German Published Application 1,802,435 | Resin of Example 23 |
|---|---|---|---|
| with UV | 96 | 84.5 | 84.6 |
| without UV | 87.5 | 80.0 | 80.5 |

TABLE 9

(Example 24)
Drainage acceleration (measured as reduction in freeness in ° SR)
Material: Newspapers (beaten in Ultraturrax unit to a smooth composition)

| | pH 7.3 | | pH 5 | 1.5 of alum |
|---|---|---|---|---|
| Additive (100% resin, based on absolutely dry cellulose) | 0.05 | 0.1% | 0.05 | 0.1% |
| Control value (no resin added) (° SR) | 47 | | 50 | |
| Modified PEI (according to Ex. 3 of German Published Application 1,802,435) | 34 | 27 | 38 | 36 |
| Resin of Example 24 | 41 | 34 | 42 | 39 |

TABLE 9b

Filler retention: ash content of paper in %; addition or resin (100%): 0.015% and 0.03%, based on cellulose and filler

| | | | |
|---|---|---|---|
| pH of fiber suspension | 6 | 4.8 | |
| Alum added, based on cellulose and filler: | 0.5% | 1.5% | |
| Control value: | 3.6 | 3.8 | % of ash in paper |
| Modified PEI (of Ex. 3 of German Published Application 1,802,435): | | | |
| 0.015% addition | 6.6 | 7.3 | |
| 0.03% addition | 8.8 | 9.0 | |
| Resin of Example 24: | | | |
| 0.015% addition | 7.4 | 6.4 | |
| 0.03% addition | 9.1 | 7.9 | |

TABLE 9c

Influence on paper whiteness and effect on optical brighteners

| | Control value | Resin of Ex. 3 of German Published Application 1,802,435 | Resin of Example 24 |
|---|---|---|---|
| with UV | 96.1 | 85.8 | 87.5 |
| without UV | 87.7 | 80.1 | 79.9 |

TABLE 10a (Example 25)
Drainage acceleration (measured as reduction in freeness in ° SR)
Material: Newspapers (beaten in Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 63 | | 57 | |
| Modified PEI (according to Ex. 6 of German Published Application 1,802,435) | 53 | 46 | 46 | 43 |
| Resin of Example 25 | 53 | 44 | 43 | 38 |

TABLE 10b

Filler retention: ash content of paper in %; addition of resin (100%): 0.015% and 0.03%, based on cellulose and filler

| | | | |
|---|---|---|---|
| pH of fiber suspension | 6 | 4.8 | |
| Alum added, based on cellulose and filler: | 0.5% | 1.5% | |
| Control value: | 2.8 | 3.1 | % of ash in paper |
| Modified PEI (of Ex. 6 of German Published Application 1,802,435): | | | |
| 0.015% addition | 5.0 | 5.6 | |
| 0.03% addition | 6.6 | 6.7 | |
| Resin of Example 25: | | | |
| 0.015% addition | 5.8 | 5.9 | |
| 0.03% addition | 6.8 | 7.4 | |

TABLE 10c

Influence on paper whiteness and effect on optical brighteners

| | Control value | Resin of Ex. 6 of German Published Application 1,802,435 | Resin of Example 25 |
|---|---|---|---|
| with UV | 95.8 | 79.7 | 83.6 |
| without UV | 88.9 | 77.7 | 79.3 |

TABLE 11a (Example 26)
Drainage acceleration (measured as reduction in freeness in ° SR)
Material: Newspapers (beaten in Ultraturrax unit to a smooth composition)

| | pH 7.3 | | pH 5 | 1.5% of alum |
|---|---|---|---|---|
| Additive (100% resin, based on absolutely dry cellulose) | 0.05 | 0.1% | 0.5% | 0.1% |
| Control value (no resin added) (° SR) | 57 | | 52 | |
| Modified PEI (according to Ex. 6 of German Published Application 1,802,435) | 42 | 34 | 28 | 27 |

TABLE 11a-continued (Example 26)
Drainage acceleration (measured as reduction in freeness in °SR)
Material: Newspapers (beaten in Ultraturrax unit to a smooth composition)

|  | pH 7.3 | pH 5 | 1.5% of alum |  |
|---|---|---|---|---|
| Resin of Example 26 | 44 | 36 | 31 | 28 |

TABLE 11b

Filler retention: ash content of paper in %; addition of resin (100%): 0.015% and 0.03%, based on cellulose and filler

| pH of fiber suspension | 6 | 4.8 |  |
|---|---|---|---|
| Alum added, based on cellulose and filler: | 0.5% | 1.5% |  |
| Control value: | 3.6 | 3.5 | % of ash in paper |
| Modified PEI (of Ex. 6 of German Published Application 1,802,435): |  |  |  |
| 0.015% addition | 5.9 | 5.0 |  |
| 0.03% addition | 8.1 | 7.0 |  |
| Resin of Example 26: |  |  |  |
| 0.015% addition | 6.2 | 5.3 |  |
| 0.03% addition | 8.7 | 7.7 |  |

TABLE 11c

Influence on paper whiteness and effect on optical brighteners

|  | Control value | Resin of Ex. 6 of German Published Application 1,802,435 | Resin of Example 26 |
|---|---|---|---|
| with UV | 95.8 | 79.7 | 84.3 |
| without UV | 88.9 | 77.7 | 80.5 |

TABLE 12a (Example 27)
Drainage acceleration (measured as reduction in freeness in °SR)
Material: Newspapers (beaten in Ultraturrax unit to a smooth composition)

|  | pH 7.3 |  | pH 5 | 1.5% of alum |
|---|---|---|---|---|
| Additive (100% resin, based on absolutely dry cellulose) | 0.05 | 0.1% | 0.05 | 0.1% |
| Control value (no resin added) (°SR) | 63 |  | 57 |  |
| Modified PEI (according to Ex. 6 of German Published Application 1,802,435) | 53 | 46 | 46 | 43 |
| Resin of Example 27 | 55 | 45 | 47 | 43 |

TABLE 12b

Filler retention: ash content of paper in %; addition of resin (100%): 0.015% and 0.03%, based on cellulose and filler

| pH of fiber suspension | 6 | 4.8 |  |
|---|---|---|---|
| Alum added, based on cellulose and filler: | 0.5% | 1.5% |  |
| Control value: | 2.8 | 3.1 | % of ash in paper |
| Modified PEI (of Ex. 6 of German Published Application 1,802,435): |  |  |  |
| 0.015% addition | 5.0 | 5.6 |  |
| 0.03% addition | 6.6 | 6.7 |  |
| Resin of Example 27: |  |  |  |
| 0.015% addition | 5.4 | 6.0 |  |
| 0.03% addition | 6.8 | 7.4 |  |

TABLE 12c

Influence on paper whiteness and effect on optical brighteners

|  | Control value | Resin of Ex. 6 of German Published Application 1,802,435 | Resin of Example 27 |
|---|---|---|---|
| with UV | 95.7 | 79.6 | 85.2 |
| without UV | 88.7 | 77.3 | 81.0 |

TABLE 13a (Example 28)
Drainage acceleration (measured as reduction in freeness in °SR)
Material: Newspapers (beaten in Ultraturrax unit to a smooth composition)

|  | pH 7.3 |  | pH 5 | 1.5% of alum |
|---|---|---|---|---|
| Additive (100% resin, based on absolutely dry cellulose) | 0.05 | 0.1% | 0.05 | 0.1% |
| Control value (no resin added) (°SR) | 73 |  | 65 |  |
| Modified PEI (according to Ex. 6 of German Published Application 1,802,435) | 54 | 39 | 48 | 46 |
| Resin of Example 28 | 54 | 36 | 48 | 46 |

TABLE 13b

Filler retention: ash content of paper in %; addition of resin (100%): 0.015% and 0.03%, based on cellulose and filler

| pH of fiber suspension | 6 | 4.8 |  |
|---|---|---|---|
| Alum added, based on cellulose and filler: | 0.5% | 1.5% |  |
| Control value: | 2.9 | 2.2 | % of ash in paper |
| Modified PEI (of Ex. 6 of German Published Application 1,802,435) |  |  |  |
| 0.015% addition | 6.7 | 7.4 |  |
| 0.03% addition | 9.5 | 9.7 |  |
| Resin of Example 28: |  |  |  |
| 0.015% addition | 5.6 | 9.5 |  |
| 0.03% addition | 9.4 | 10.9 |  |

TABLE 13c

Influence on paper whiteness and effect on optical brighteners

|  | Control value | Resin of Ex. 6 of German Published Application 1,802,435 | Resin of Example 28 |
|---|---|---|---|
| with UV | 95.7 | 79.6 | 85.7 |
| without UV | 88.7 | 77.3 | 81.5 |

TABLE 14a (Example 29)
Drainage acceleration (measured as reduction in freeness in °SR)
Material: Newspapers (beaten in Ultraturrax unit to a smooth composition)

|  | pH 7.3 |  | pH 5 | 1.5% of alum |
|---|---|---|---|---|
| Additive (100% resin, based on absolutely dry cellulose) | 0.05 | 0.1% | 0.05 | 0.1% |
| Control value (no resin added) (°SR) | 52 |  | 49 |  |
| Modified PEI (according to Ex. 3B of German Publbished Application 1,802,435) | 40 | 29 | 36 | 35 |
| Resin of Example 29 | 44 | 34 | 36 | 35 |

TABLE 14b

Filler retention: ash content of paper in %; addition of resin (100%): 0.015% and 0.03%, based on cellulose and filler

| pH of fiber suspension | 6 | 4.8 |  |
|---|---|---|---|
| Alum added, based on cellulose and filler: | 0.5% | 1.5% |  |
| Control value: | 3.6 | 4.0 | % of ash in paper |
| Modified PEI (of Ex. 3B of German Published Application 1,802,435) |  |  |  |
| 0.015% addition | 6.2 | 8.3 |  |
| 0.03% addition | 8.0 | 9.8 |  |
| Resin of Example 29: |  |  |  |
| 0.015% addition | 7.3 | 8.3 |  |
| 0.03% addition | 8.8 | 9.9 |  |

TABLE 14c

Influence on paper whiteness and effect on optical brighteners

|  | Control value | Resin of Ex. 3B of German Published Application 1,803,435 | Resin of Ex. 29 |
|---|---|---|---|
| with UV | 95.2 | 80.7 | 87.0 |

TABLE 14c-continued
Influence on paper whiteness and effect on optical brighteners

|  | Control value | Resin of Ex. 3B of German Published Application 1,803,435 | Resin of Ex. 29 |
|---|---|---|---|
| without UV | 88.0 | 78.6 | 83.1 |

TABLE 15a
(Example 30)
Drainage acceleration (measured as reduction in freeness in ° SR)
Material: Newspapers (beaten in Ultraturrax unit to a smooth composition)

|  | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 55 | | 65 | |
| Modified PEI (according to Ex. 6 of German Published Application 1,802,435) | 41 | 33 | 49 | 47 |
| Resin of Example 30 | 40 | 31 | 49 | 46 |

TABLE 15b

| Filler retention: ash content of paper in %; addition of resin (100%): 0.015% and 0.03%, based on cellulose and filler | | | |
|---|---|---|---|
| pH of fiber suspension | 6 | 4.8 | |
| Alum added, based on cellulose and filler: | 0.5% | 1.5% | |
| Control value: | 3.5 | 3.3 | % of ash in paper |
| Modified PEI (of Ex. 6 of German Published Application 1,802,435): | | | |
| 0.015% addition | 7.5 | 6.7 | |
| 0.03% addition | 9.7 | 7.4 | |
| Resin of Example 30: | | | |
| 0.015% addition | 8.4 | 7.9 | |
| 0.03% addition | 11.3 | 9.2 | |

TABLE 15c
Influence on paper whiteness and effect on optical brighteners

|  | Control value | Resin of Ex. 6 of German Published Application 1,802,435 | Resin of Ex. 30 |
|---|---|---|---|
| with UV | 95.0 | 79,3 | 81.3 |
| without UV | 87.5 | 77.1 | 79.5 |

TABLE 16a
(Example 31)
Drainage acceleration (measured as reduction in freeness in ° SR)
Material: Newspapers (beaten in Ultraturrax unit to a smooth composition)

|  | pH 7.3 | | pH 5 | 1.5% of alum |
|---|---|---|---|---|
| Additive (100% resin, based on absolutely dry cellulose) | 0.05 | 0.1% | 0.05 | 0.1% |
| Control value (no resin added) (° SR) | 73 | | 65 | |
| Modified PEI (according to Ex. 6 of German Published Application 1,802,435) | 54 | 39 | 48 | 46 |
| Resin of Example 31 | 53 | 36 | 47 | 45 |

TABLE 16b

| Filler retention: ash content of paper in %; addition of resin (100%): 0.015% and 0.03%, based on cellulose and filler | | | |
|---|---|---|---|
| pH of fiber suspension | 6 | 4.8 | |
| Alum added, based on cellulose and filler: | 0.5% | 1.5% | |
| Control value: | 2.5 | 3.3 | % of ash in paper |
| Modified PEI (of Ex. 6 of German Published Application 1,802,435): | | | |
| 0.015% addition | 5.1 | 5.2 | |
| 0.03% addition | 6.8 | 8.2 | |
| Resin of Example 31: | | | |
| 0.015% addition | 5.5 | 7.3 | |
| 0.03% addition | 8.0 | 8.7 | |

TABLE 16c
Influence on paper whiteness and effect on optical brighteners

|  | Control value | Resin of Ex. 6 of German Published Application 1,802,435 | Resin of Example 31 |
|---|---|---|---|
| with UV | 96.6 | 83.1 | 84.5 |
| without UV | 88.1 | 79.5 | 81.0 |

TABLE 17a
(Example 32)
Drainage acceleration (measured as reduction in freeness in ° SR)
Material: Newspapers (beaten in Ultraturrax unit to a smooth composition)

|  | pH 7.3 | | pH 5 | 1.5% of alum |
|---|---|---|---|---|
| Additive (100% resin, based on absolutely dry cellulose | 0.05 | 0.1% | 0.05 | 1.0% |
| Control value (no resin added) (° SR) | 73 | | 65 | |
| Modified PEI (according to Ex. 6 of German Published Application 1,802,435) | 54 | 39 | 48 | 46 |
| Resin of Example 32 | 52 | 38 | 47 | 45 |

TABLE 17b

| Filler retention: ash content of paper in %; addition of resin (100%): 0.015% and 0.03%, based on cellulose and filler | | | |
|---|---|---|---|
| pH of fiber suspension | 6 | 4.8 | |
| Alum added, based on cellulose and filler: | 0.5% | 1.5% | |
| Control value: | 2.5 | 3.3 | % of ash in paper |
| Modified PEI (of Ex. 6 of German Published Application 1,802,435): | | | |
| 0.015% addition | 5.1 | 5.2 | |
| 0.03% addition | 6.8 | 8.2 | |
| Resin of Example 32: | | | |
| 0.015% addition | 6.4 | 6.9 | |
| 0.03% addition | 7.1 | 9.3 | |

TABLE 17c
Influence on paper whiteness and effect on optical brighteners

|  | Control value | Resin of Ex.6 of German Published Application 1,802,435 | Resin of Example 32 |
|---|---|---|---|
| with UV | 96.5 | 83.3 | 85.8 |
| without UV | 88.0 | 79.5 | 82.5 |

We claim:

1. A process for the production of paper which comprises adding as drainage and retention aids to an aqueous suspension of cellulosic fibers for making paper sheet, from about 0.01 to 0.3% by weight, based on the dry weight of cellulosic fiber in the pulp, of a water-soluble crosslinked reaction product obtained by reacting
   a. one equivalent of NH groups of a polyalkylene polyamine having from 15 to 500 alkyleneimine units wherein said polyalkylene polyamine is an imine homopolymer with
   b. from 0.001 to 0.08 mole of a product obtained by reacting a polyalkylene oxide having from 8 to 100 alkylene oxide units with epichlorohydrin such that from 1.0 to 1.5 moles of epichlorohydrin are present per equivalent of the hydroxyl groups in the polyalkylene oxide, at a temperature of from 20° to 100° C in aqueous solution having a solids content of from 5 to 50% by weight, the reaction being carried to a point at which the viscosity of an aqueous solution containing 20% by weight of the auxiliary is from 300 to 1,500 centipoises (20° C).

2. A process as set forth in claim 1, wherein component (a) of the crosslinked reaction product is polyethyleneimine and component (b) of said reaction product is a block copolymer having the formula $$A[(OR^1)_m(OR^2)_n(OR^1)_pOH]_x$$

in which $R^1$ is —$CH_2$—$CH_2$—; $R^2$ is

$m$ and $p$ both denote values from 4 to 50;
$n$ is a value from 0 to 5;
$x$ is a value from 2 to 6; and
A is a radical of a polyhydric alcohol having from 2 to 6 carbon atoms, a propylene oxide radical or a polypropylene oxide chain having up to 50 propylene oxide units.

3. A process set forth in claim 1, wherein the amount of component $b$ is from 0.002 to 0.06 mole.

* * * * *

UNITED STATES PATENT AND TRADEMARK OFFICE
CERTIFICATE OF CORRECTION

PATENT NO. : 4,066,494
DATED : January 3, 1978
INVENTOR(S) : Emil Scharf et al

It is certified that error appears in the above-identified patent and that said Letters Patent are hereby corrected as shown below:

First page, in the Abstract, line 9, "29°" should read --20°--.

Signed and Sealed this

Fifteenth Day of August 1978

[SEAL]

Attest:

RUTH C. MASON
Attesting Officer

DONALD W. BANNER
Commissioner of Patents and Trademarks